(12) United States Patent
Okumura et al.

(10) Patent No.: US 7,413,174 B2
(45) Date of Patent: Aug. 19, 2008

(54) FLUID-FILLED TYPE VIBRATION-DAMPING DEVICE

(75) Inventors: Kei Okumura, Kakamigahara (JP); Tomohiro Kanaya, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 189 days.

(21) Appl. No.: 11/386,890

(22) Filed: Mar. 23, 2006

(65) Prior Publication Data

US 2006/0220288 A1 Oct. 5, 2006

(30) Foreign Application Priority Data

Mar. 29, 2005 (JP) ............... 2005-096231

(51) Int. Cl.
F16F 5/00 (2006.01)
F16M 3/00 (2006.01)

(52) U.S. Cl. ............... 267/140.13; 267/140.15

(58) Field of Classification Search ............ 267/140.13, 267/140.14, 140.15; 248/560, 562, 638
See application file for complete search history.

(56) References Cited

U.S. PATENT DOCUMENTS

| | | | | |
|---|---|---|---|---|
| 5,927,698 A | * | 7/1999 | Miyoshi et al. | 267/140.13 |
| 6,598,865 B1 | * | 7/2003 | Kato | 267/140.13 |
| 6,679,486 B2 | | 1/2004 | Muramatsu et al. | |
| 6,994,332 B2 | * | 2/2006 | Goto et al. | 267/140.13 |
| 7,128,311 B2 | * | 10/2006 | Goto et al. | 267/140.14 |
| 7,140,602 B2 | * | 11/2006 | Goto et al. | 267/140.13 |
| 7,168,692 B2 | * | 1/2007 | Maeno et al. | 267/140.13 |
| 2003/0001322 A1 | | 1/2003 | Goto et al. | |
| 2004/0188901 A1 | * | 9/2004 | Debolt et al. | 267/140.13 |
| 2005/0200061 A1 | * | 9/2005 | Nemoto | 267/140.14 |
| 2006/0220289 A1 | * | 10/2006 | Okumura et al. | 267/140.13 |

FOREIGN PATENT DOCUMENTS

| | | | |
|---|---|---|---|
| JP | A 2000-065125 | | 3/2000 |
| JP | A 2000-346121 | | 12/2000 |
| JP | 2004232803 A | * | 8/2004 |

* cited by examiner

*Primary Examiner*—Melody M Burch
(74) *Attorney, Agent, or Firm*—Oliff & Berridge, PLC

(57) ABSTRACT

A fluid-filled type vibration-damping device having: an elastic body connecting first and a second mounting members; a pressure-receiving chamber formed axially below the main rubber elastic body and partially defined by the main rubber elastic body; an equilibrium chamber formed between the main rubber elastic body and a flexible film by disposing the flexible film so as to cover an outside face of the main rubber elastic body; and an orifice passage through which both chambers communicate with each other. An equilibrium-chamber-side opening of the orifice passage is situated in proximity to an axial lower end of the outside face of the elastic body. A guide groove extending axially upward is formed in proximity to the equilibrium-chamber-side opening. A projecting rib projects from the flexible film towards the guide groove is formed extending along the guide groove.

7 Claims, 2 Drawing Sheets

FLUID-FILLED TYPE VIBRATION-DAMPING DEVICE

INCORPORATED BY REFERENCE

The disclosure of Japanese Patent Application No. 2005-096231 filed on Mar. 29, 2005 including the specification, drawings and abstract is incorporated herein by reference in its entirety.

BACKGROUND OF THE INVENTION

1. Field of the Invention

The present invention generally relates to a fluid-filled type vibration-damping device for producing vibration damping action based on flow action of a non-compressible fluid sealed inside, and more particularly to a fluid-filled type vibration-damping device suitable for use as an automotive engine mount, for example.

2. Description of the Related Art

As one type vibration-damping connector or vibration-damping support for installation between members making up a vibration transmission system, there has previously been proposed a fluid-filled type vibration-damping device of construction having a first mounting member and a second mounting member spaced apart from one another and connected by a main rubber elastic body; a pressure-receiving chamber a portion of whose wall is constituted by the main rubber elastic body; and an equilibrium chamber a portion of whose wall is constituted by a flexible film; as well as having an orifice passage interconnecting the two pressure-receiving chamber and the equilibrium chamber.

In such fluid-filled type vibration-damping devices, on the basis of resonance action of the fluid induced to flow through the orifice passage, it is possible to derive vibration damping action not readily achieved with the main rubber elastic body alone. Consequently, the fluid-filled type vibration-damping devices have been provided as an automotive engine mount and the like. Among these, there has been proposed a fluid-filled type vibration-damping device that, for reasons relating to vehicle layout, has the pressure receiving chamber formed to one side of the main rubber elastic body, the equilibrium chamber formed to the other side, and with the device installed in the automobile, the pressure-receiving chamber is positioned below the main rubber elastic body while the equilibrium chamber is positioned above the equilibrium chamber.

In order to achieve effective vibration damping action in a fluid-filled type vibration-damping device, it is important that flow of fluid through the orifice passage occur smoothly and stably.

The assignee proposed in the prior U.S. patent application Ser. No. 10/188,243 (U.S. Publication No. 2003-0001322 A1), a construction employing a generally frustoconical main rubber elastic body having in proximity to the large-diameter end of an upper tapered face thereof an opening which leads to the equilibrium chamber side of the orifice passage, and having a guide groove extending in a straight line from this opening towards the small-diameter end of the upper tapered face of the main rubber elastic body. By means of furnishing this guide groove, it is possible to stabilize the condition of fluid flow between the orifice passage and the equilibrium chamber, which is particular prone to unsteady fluid flow conditions or pressure distributions caused by deformation of the flexible film; and on the basis of this stabilization to improve and stabilize vibration damping action based on resonance or other such flow action of fluid induced to flow through the orifice passage.

However, as a result of further investigation, the inventors have found that, depending on the condition of installation of the vibration damping device, the construction taught in the aforementioned prior U.S. patent application may have some unresolved problems.

Specifically, when relatively low pressure is created in the pressure-receiving chamber in association with input of vibration, thereby causing fluid to flow from the equilibrium chamber into the pressure-receiving chamber through the orifice passage, the guide groove (which as described above is formed so as to open onto the surface of the main rubber elastic body) becomes covered up by the flexible film, posing the risk that the orifice passage will become closed off. In particular, in a fluid-filled type vibration-damping device of the design described previously having a pressure-receiving chamber and an equilibrium chamber formed above and below the main rubber elastic body, the action of gravity on the fluid sealed in the equilibrium chamber and on the flexible film also acts in the direction such that the opening of the guide groove, i.e. the opening of the orifice passage, is closed off by the flexible film. Additionally, by means of fluid flow guiding action of the guide groove, large pressure fluctuations along the guide groove (which extends in a straight line from the opening of the orifice passage into the equilibrium chamber) tend to be exerted on the equilibrium chamber, and thus there is a risk that localized large pressure fluctuations will occur in the area of the guide groove, whereby the flexible film tends to be easily pulled against the opening of the guide groove.

In recent years, there has been a trend towards making the amount of sealed fluid relatively small for the purpose of reducing the weight of vibration damping devices. Under this trend, the problem of the orifice passage becoming closed off will tend to become more imminent.

Also, in recent years, there have been proposed fluid-filled vibration-damping devices of dynamic type, furnished with an electromagnetic actuator so as to be able to actively control pressure fluctuations in the pressure-receiving chamber. However, with such dynamic type fluid-filled vibration-damping devices, since the intention is to actively produce relative pressure fluctuations of the pressure-receiving chamber and the equilibrium chamber and increase the flow of fluid through the orifice passage, the problem of the orifice passage becoming blocked off due to the guide groove being covered by the flexible film as described above will tend to be more likely to occur.

If the guide groove becomes covered by the flexible film in this way, the fluid flow guiding action of the guide groove, as well as the vibration damping action per se, which is based on the flow action of the fluid induced to flow through the orifice passage, will unavoidably experience an appreciable drop. A further problem is that repeated contact of the flexible film against the corner of the opening may cause reduced durability of the flexible film.

To address such problems, it may be contemplated, for example, to employ a special multidirectional branched configuration for the guide groove so that localized pressure fluctuations are dispersed. However, not only would a guide groove of such complicated shape be difficult to produce, but the flow of fluid along the guide groove would no longer be smooth. This would have the result of hampering the basic purpose of the guide groove, namely, to increase the flow of fluid through the orifice passage and to stabilize fluid flow.

SUMMARY OF THE INVENTION

It is therefore one object of this invention to provide a fluid-filled type vibration-damping device of specific construction having, to either side of a main rubber elastic body, a pressure-receiving chamber situated therebelow and an equilibrium chamber thereabove, wherein the fluid-filled type vibration-damping device has improved construction that can prevent the guide groove from becoming covered by the flexible film, while at the same time effectively ensuring fluid flow guiding action by the guide groove formed in the main rubber elastic body.

It is another object to provide a fluid-filled type vibration-damping device that, by means of the above, is able even under harsh conditions to prevent the guide groove from being covered by the flexible film and to effectively and consistently achieve flow-regulating guiding action by the guide groove on fluid induced to flow through the orifice passage, whereby vibration damping action based on resonance and other flow action of fluid induced to flow through the orifice passage can be attained effectively and consistently.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled type vibration-damping device A fluid-filled type vibration-damping device comprising: a main rubber elastic body of generally frustoconical shape; a first mounting member affixed to an axial upper end of the main rubber elastic body; a second mounting member affixed to the axial lower end of the main rubber elastic body; a pressure-receiving chamber formed axially below the main rubber elastic body, being partially defined by the main rubber elastic body and having a non-compressible fluid sealed therein; an equilibrium chamber having a non-compressible fluid sealed therein and formed between the main rubber elastic body and a flexible film by disposing the flexible film so as to cover an outside face of the main rubber elastic body; and an orifice passage through which the pressure-receiving chamber and the equilibrium chamber communicate with each other; wherein an equilibrium-chamber-side opening of the orifice passage is situated in proximity to an axial lower end of the outside face of the main rubber elastic body; wherein a guide groove extending in a straight line axially upward is formed on the outside face of the main rubber elastic body in proximity to the equilibrium-chamber-side opening of the orifice passage; and wherein a projecting rib that projects from the flexible film towards the guide groove is formed extending along the guide groove.

In the fluid-filled type vibration-damping device constructed according to this mode, the projecting rib is brought into contact against the outside peripheral face of the main rubber elastic body, so that excessive elastic deformation of the flexible film in proximity to the opening of the orifice passage on the equilibrium chamber side is restricted. Additionally, the flexible film and the main rubber elastic body are kept apart from each other in proximity to the opening of the orifice passage on the equilibrium chamber side. With this arrangement, stable flow of fluid is produced through the orifice passage.

Accordingly, the fluid induced to flow through the orifice passage undergoes stable flow regulation on the basis of the guiding action of the guide groove, particularly within the equilibrium chamber where stable flow conditions are difficult to achieve due to deformation of the flexible film. This makes it possible to efficiently reduced flow resistance and disperse pressure fluctuations, so that flow regulating effect by the guide groove is maintained consistently under various conditions, such as during input of large vibration load. As a result, the intended vibration damping effect based on resonance and other flow action of the fluid is achieved consistently and effectively, with high reliability.

Furthermore, since excessive elastic deformation of the flexible film is restricted by the projecting rib, splitting or partial deterioration of the flexible film due to localized excessive deformation of the flexible film can be effectively prevented from occurring, so that it is possible to achieve improved durability.

The projecting rib should be interpreted to includes a single ridge, a plural number of two or more, and the like. Each projecting rib may extend continuously in the lengthwise direction, or may be substantially divided into a plurality of mutually independent segments in the lengthwise direction. Preferably, for example, a pair of projecting ribs situated spaced apart in the width direction of the guide groove would be formed so that each of them extends along the guide groove. That is, by forming a pair of projecting ribs spaced apart in the width direction of the guide groove, the state of contact is stabilized so that inclination of the flexible film is prevented. With this arrangement, it is possible to more effectively prevent irregular deformation and stress concentrations in the flexible film, and achieve further improvement in durability.

In addition, since the pair of projecting ribs are spaced apart from each other, and extend approximately parallel to the length direction of the guide groove, the fluid guiding action of the guide groove is unimpaired by the presence of the pair of projecting ribs, and in fact further improvement in guiding action can be expected. This maintenance and improvement of fluid guiding action afforded by the projecting ribs may be maintained in similar fashion even in a state in which the projecting ribs are in contact with the main rubber elastic body in which the guide groove is formed.

A second mode of the invention provides a fluid-filled type vibration-damping device according to the first mode wherein the guide groove is of sloped shape decreasing gradually in depth dimension as it goes away from the equilibrium-chamber-side opening of the orifice passage.

In the fluid-filled type vibration-damping device constructed in accordance with this mode, by imparting to the guide groove a sloped shape decreasing gradually in depth dimension as it goes away from the opening of the orifice passage, improvement in fluid guiding action by the guide groove can be expected. Specifically, it becomes possible to make even more smooth the flow of fluid induced to flow through the guide groove and through the orifice passage, and to more effectively achieve vibration damping action based on resonance of the flowing fluid.

A third mode of the invention provides a fluid-filled type vibration-damping device according to the first or second mode wherein the flexible film, at least in a region thereof covering an area where the guide groove is to be formed, includes: an outside vertical wall portion that projects so as to rise axially upward from an outside peripheral edge of the axial lower end of the main rubber elastic body; a bowing wall portion that extends bowing diametrically inward in arcuate shape from a projecting distal edge of the outside vertical wall portion; and an inside peripheral upper wall portion that expands diametrically inward in a generally flat shape from an inside peripheral edge of the bowing wall portion, and wherein the projecting rib projects from inside faces of the outside vertical wall portion, the bowing wall portion, and the inside peripheral upper wall portion of the flexible film, and is integrally formed over the outside vertical wall portion, bowing wall portion, and inside peripheral upper wall portion.

In the fluid-filled type vibration-damping device constructed according to this mode, the projecting rib is formed in the area straddling both sides (i.e. the outside vertical wall portion and inside peripheral upper wall portion) of the flexible film that includes the bowing portion, the projecting rib is prevented from readily deforming in the basal end portion thereof, and can reliably be maintained in a state of projecting in the prescribed direction of projection. Consequently, the outstanding effects of the projecting rib, such as inhibiting excessive elastic deformation of the flexible film and regulating fluid flow, can be consistently produced. That is, strength of the projecting rib can be advantageously assured, and reinforcing action and durability improving action on the flexible film by the projecting rib can be expected.

A fourth mode of the invention provides a fluid-filled type vibration-damping device according to any one of the first to third modes, wherein the projecting rib is formed extending in the groove direction of the guide groove, with a cross section of smaller width dimension at a distal end side than at a basal end in a direction of projection. By way of a specific form of the projecting rib, a gradually narrowing, generally ridge shaped cross section is possible. Also, a stepped cross section having a width dimension that is larger in stepwise fashion at its basal portion only is possible. In the case of a stepped cross section, the thick-width section at the basal portion of the projecting rib can constitute a reinforcing rib.

In the fluid-filled type vibration-damping device constructed in accordance with this mode, soft spring characteristics are exhibited when the projecting rib comes into contact against the main rubber, thus cushioning the impact, as well as preventing excessive elastic deformation in the case of strong contact force.

A fifth mode of the invention provides a fluid-filled type vibration-damping device according to any one of the first to fourth modes, wherein at a minimum with the device in an installed state being subjected to input of static support load, a projecting distal end portion of the projecting rib, over at least a lengthwise portion thereof, is positioned within the guide groove.

In the fluid-filled type vibration-damping device constructed in accordance with this mode, a state of contact of the projecting rib resulting from dislodgment from the guide groove, or irregular change in the condition of deformation of the flexible film, can be prevented. With this arrangement, the aforementioned intended working effects afforded by the projecting rib are more consistently attained.

As will be apparent from the preceding description, the fluid-filled type vibration-damping device of construction according to the present invention is able to effectively regulate fluid flow by means of cooperative action of the guide groove and the projecting rib, affording smoother flow of fluid through the orifice passage. This arrangement makes it possible attain consistently and effectively the intended vibration damping action based on flow action of the fluid, with high reliability.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
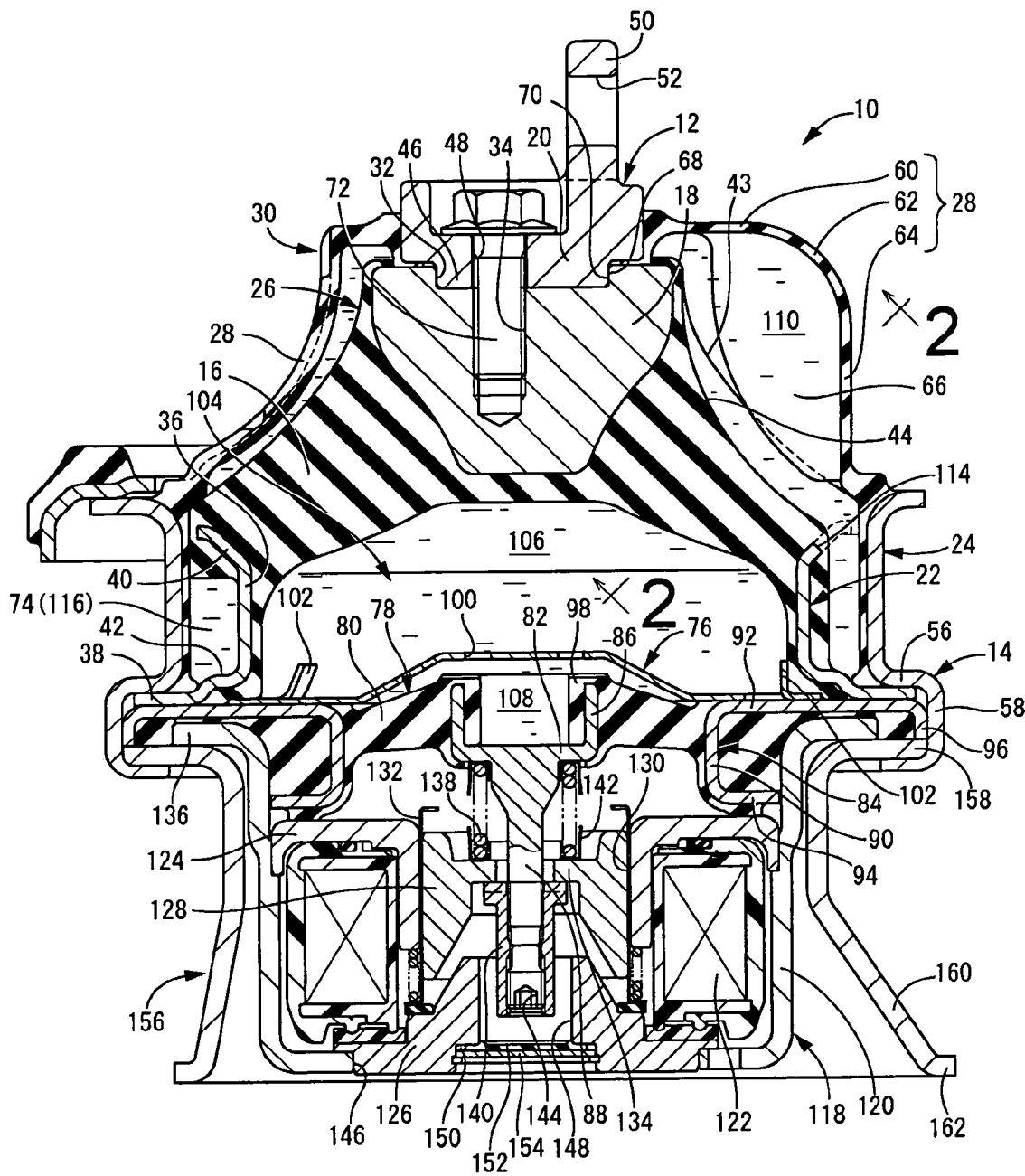
FIG. 1 is an elevational view in axial or vertical cross section of a fluid-filled type vibration damping device in the form of an automotive engine mount of construction according to one preferred embodiment.
Figure 2:
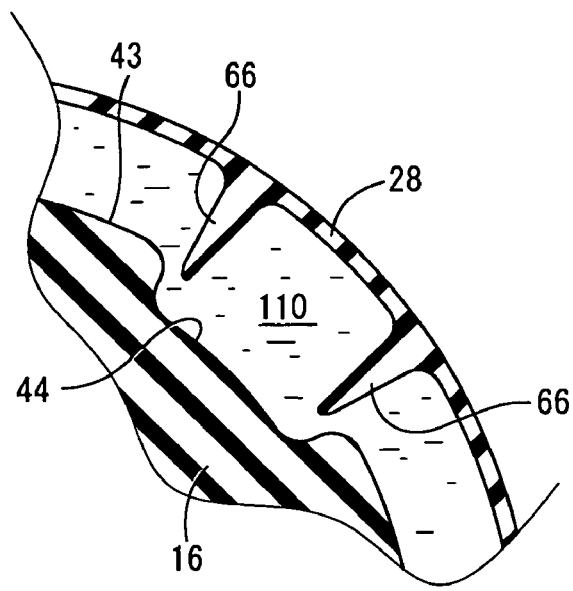
FIG. 2 is a cross sectional view showing a principle part of the engine mount of FIG. 1, taken along line 2-2 of FIG. 1.

Referring first to FIG. 1, there is shown an automotive engine mount 10 as a first embodiment of a fluid-filled type vibration-damping device of the invention. The engine mount 10 is constructed of a first mounting member 12 of metal and a second mounting member 14 of metal, these being elastically coupled by a main rubber elastic body 16. With the first mounting member 12 attached to the power unit of the vehicle (not shown) and the second mounting member 14 attached to the body of the vehicle (not shown), the power unit is supported on the body in a vibration-damping fashion. In this installed state, the distributed load of the power unit and the principal vibration to be damped are each input across the first mounting member 12 and the second mounting member 14, in the generally axial direction of the engine mount 10 (the vertical direction in FIG. 1). In the description hereinbelow the vertical direction shall as general rule refer to the vertical direction in FIG. 1.

To describe in greater detail, the first mounting member 12 is composed of a main rubber inner fitting 18 and a diaphragm inner fitting 20, while the second mounting member 14 is composed of a main rubber outer tubular fitting 22 and a diaphragm outer tubular fitting 24. The main rubber inner fitting 18 and the main rubber outer tubular fitting 22 are vulcanization bonded to the main rubber elastic body 16, forming a first integrally vulcanization molded component 26. The diaphragm inner fitting 20 and the diaphragm outer tubular fitting 24 are vulcanization bonded to a diaphragm 28 serving as a flexible film, to form a second integrally vulcanization molded component 30, with the first and second integrally vulcanization molded components 26, 30 being assembled to one another.

Here, the main rubber inner fitting 18 constituting part of the first integrally vulcanization molded component 26 has an inverted, generally frustoconical shape. On the upper end face (large-diameter end face) of the main rubber inner fitting 18 is formed a mating recess 32, with a screw hole 34 disposed opening onto the floor of the mating recess 32.

The main rubber outer tubular fitting 22 has a tubular wall section 36 as a tubular section of generally large-diameter round tubular shape. At the axial lower end of this tubular wall section 36, there is integrally formed a flange shaped portion 38 that expands diametrically outward. The axial upper end portion of the tubular wall section 36 constitutes a tapered tube portion 40 that gradually flares outward going axially upward. By means of this design, there is formed on the outside peripheral side of the main rubber outer tubular fitting 22 a circumferential groove 42 that opens onto the outside peripheral face and extends over a distance just short of once around the circumference. The main rubber inner fitting 18 is disposed above and spaced apart from the main rubber outer tubular fitting 22, positioned on approximately the same center axis therewith, with the inverted tapered outside peripheral face of the main rubber inner fitting 18 and the inside peripheral face of the tapered tube portion 40 of the main rubber outer tubular fitting 22 positioned in opposition and spaced apart from one another. These opposed faces of the main rubber inner fitting 18 and the main rubber outer tubular fitting 22 being elastically coupled by means of the main rubber elastic body 16.

The main rubber elastic body 16 has a large-diameter frustoconical shape overall, which gradually increases in diameter going axially downward. On a sloped side wall face 43 which constitutes the tapered outside face forming the outside peripheral face of the main rubber elastic body 16, there is formed over a portion of the circumferential direction thereof a sloped groove 44 serving as a guide groove which extends in an approximately straight line on the diagonal across the sloped side wall face 43. In this embodiment, the sloped groove 44 extends from a location in proximity to the small-diameter end (axial upper end) to the large-diameter end (axial lower end) of the main rubber elastic body 16, while having a floor with a smooth face devoid of irregularities. In this embodiment, the sloped groove 44 is formed with a sloped shape of gradually shallower groove depth going from the large-diameter end towards the small-diameter end of the main rubber elastic body 16. In this embodiment, while the outside face of the main rubber elastic body 16 is constituted by the sloped side wall face 43, the outside face could also be constituted so as to include at least a portion of the sloped side wall face 43.

Additionally, the main rubber inner fitting 18 is disposed coaxially and vulcanization bonded to the main rubber elastic body 16 at the small-diameter side section which constitutes the axial upper end section thereof; while the tapered tube portion 40 of the main rubber outer tubular fitting 22 is superimposed against and vulcanization bonded to the outside peripheral face of the main rubber elastic body 16 at the large-diameter side section which constitutes the axial lower end section thereof. By means of this design, the main rubber elastic body 16 takes the form of an integrally vulcanization molded component comprising the main rubber inner fitting 18 and the main rubber outer tubular fitting 22. In this embodiment in particular, the main rubber inner fitting 18 being disposed coaxially and vulcanization bonded to the main rubber elastic body 16 at the small-diameter side section refers to a condition in which the main rubber inner fitting 18 has been inserted from the small-diameter side of the main rubber elastic body 16 (upper side in FIG. 1) and is vulcanization bonded to the center portion thereof. The main rubber inner fitting 18 may instead by vulcanization bonded to the axial upper end face of the main rubber elastic body 16.

Turning now to the diaphragm inner fitting 20 constituting part of the second integrally vulcanization molded component 30, the fitting has a thick disk shape. On the lower face of the diaphragm inner fitting 20, a convex mating portion 46 is formed, and a through-hole 48 is bored through the area where this convex mating portion 46 is formed. An upwardly projecting mounting plate 50 is also formed on the diaphragm inner fitting 20, and a bolt hole 52 is formed in the center portion of the mounting plate 50.

The diaphragm outer tubular fitting 24 has thin-walled, large-diameter round tubular shape, with an annular disk shaped flange shaped portion 56 that extends diametrically outward being integrally formed at the opening at the axial lower end thereof; and on the peripheral outside edge of the flange shaped portion 56 is integrally formed an annular caulking piece 58 that projects axially downward.

The diaphragm inner fitting 20 is positioned spaced axially above and on approximately the same center axis with the diaphragm outer tubular fitting 24, with the diaphragm inner fitting 20 and the diaphragm outer tubular fitting 24 being coupled by means of the diaphragm 28.

The diaphragm 28 is formed by a thin rubber film, and is of generally annular shape overall, extending in the circumferential direction with a bowed cross section imparted with appreciable slack so as to enable it to readily undergo elastic deformation. In this embodiment, the diaphragm 28 is constituted so as to include an inside tabular portion 60 as its inside peripheral upper wall portion, a medial bowed portion 62 as its bowing wall portion, and an outside tubular wall portion 64 as its outside vertical wall portion. The inside tabular portion 60 has the generally shape of a thin annular plate spreading out in the axis-perpendicular direction of the mounting. At the diametrical outside of this inside tabular portion 60, there is integrally formed the medial bowed portion 62 as its bowing wall portion. The medial bowed portion 62 gradually bows axially downward going diametrically outward, and the outside peripheral edge thereof is integrally formed with the axial upper end of the outside tubular wall portion 64. The outside tubular wall portion 64 is of thin-walled, generally round tubular shape extending axial downward from the lower end of the medial bowed portion 62. The diaphragm 28 in this embodiment is constituted by integrally forming the inside tabular portion 60, the medial bowed portion 62, and the outside tubular wall portion 64 so as to be continuous with each other.

A pair of elastic support plates 66, 66 serving as projecting ribs are integrally formed along part of the circumferential direction of the diaphragm 28, so as to project out from the inside peripheral face thereof. These elastic support plates 66 have thin fin shape, becoming gradually thinner towards the projecting distal edge side. The projecting distal edge of each elastic support plate 66 is constituted by a bowed face. The elastic support plates 66 are formed across substantially the entire length of the inside peripheral face of the diaphragm 28, from close to the upper edge to close to the lower edge of the diaphragm 28, which has a generally annular shape extending in the circumferential direction. That is, the elastic support plates 66 in this embodiment have a shape extending across the inside tabular portion 60, the medial bowed portion 62, and the outside tubular wall portion 64 of the diaphragm 28, and extending continuously from a diametrically medial section of the inside tabular portion 60 to the axial lower end of the outside tubular wall portion 64

In this embodiment, the two elastic support plates 66, 66 are formed parallel to one another and spaced apart by a prescribed distance in the circumferential direction of the mounting, with the pair of elastic support plates 66, 66 formed so that their faces situated in opposition to one another in the circumferential direction are generally parallel to one another, while their other faces gradually come closer to one another towards their projecting distal edges. By means of this design, the pair of elastic support plates 66, 66 become gradually thinner towards their projecting distal edges, while maintaining a substantially unchanging distance between them.

The inside peripheral edge of the diaphragm 28 is vulcanization bonded to the outside peripheral edge of the diaphragm inner fitting 20, and the outside peripheral edge of the diaphragm 28 is vulcanization bonded to the opening at the axial upper side of the diaphragm outer tubular fitting 24. By means of this arrangement, the diaphragm 28 takes the form of the second integrally vulcanization molded component 30 comprising the diaphragm inner fitting 20 and the diaphragm outer tubular fitting 24.

This second integrally vulcanization molded component 30 is assembled superimposed from above against the first integrally vulcanization molded component 26 described previously, and the diaphragm inner fitting 20 is fastened to the main rubber inner fitting 18 as well as fastening the diaphragm outer tubular fitting 24 to the main rubber outer tubular fitting 22; additionally, the diaphragm 28 is positioned spaced apart outwardly from the main rubber elastic body 16, so as to cover substantially the entire outside peripheral face of the main rubber elastic body 16.

Specifically, the diaphragm inner fitting 20 is superimposed directly against the upper face of the main rubber inner fitting 18, and the convex mating portion 46 of the diaphragm inner fitting 20 is mated with the mating recess 32 of the main rubber inner fitting 18, thereby aligning the diaphragm inner fitting 20 and the main rubber inner fitting 18 on the same center axis. In this embodiment in particular, by means of the interlocking action of an interlocking outside peripheral face 68 and an interlocking inside peripheral face 70 formed in notched configuration on the outside peripheral faces of the convex mating portion 46 and the mating recess 32, the diaphragm inner fitting 20 and the main rubber inner fitting 18 are positioned with respect to one another in the circumferential direction as well, with the through-hole 48 of the diaphragm inner fitting 20 aligned with the screw hole 34 of the main rubber inner fitting 18.

As depicted in FIG. 1, with the main rubber inner fitting 18 and the diaphragm inner fitting 20 in the superimposed state, a connecting bolt 72 is passed through the through-hole 48 of the diaphragm inner fitting 20 and screwed into the screw hole 34 of the main rubber inner fitting 18. The main rubber inner fitting 18 and the diaphragm inner fitting 20 are connected together in this way to constitute the first mounting member 12.

The diaphragm outer tubular fitting 24, on the other hand, is fitted externally onto the main rubber outer tubular fitting 22 from above in the axial direction. The main rubber outer tubular fitting 22 is disposed with the outside peripheral edge of the flange shaped portion 38 at its lower end superimposed in the axial direction against the flange shaped portion 56 of the diaphragm outer tubular fitting 24, and with the rim of the opening of the tapered tube portion 40 at its upper end superimposed in the diametrical direction against the inside peripheral wall of the diaphragm outer tubular fitting 24.

By caulking the caulking piece 58 of the diaphragm outer tubular fitting 24 against the outside peripheral edge of the flange shaped portion 38 of the main rubber outer tubular fitting 22, the main rubber outer tubular fitting 22 and the diaphragm outer tubular fitting 24 are assembled fastened to one another. A seal rubber integrally formed with the main rubber elastic body 16 or the diaphragm 28 is interposed in each of the zones where the upper and lower edges of the main rubber outer tubular fitting 22 are superimposed against the diaphragm outer tubular fitting 24, providing a fluid-tight seal. By means of this design, the circumferential groove 42 formed in the main rubber outer tubular fitting 22 is covered fluid-tightly by the diaphragm outer tubular fitting 24, thereby forming an annular passage 74 that extends continuously a prescribed distance or all the way around the circumference between the diametrically opposing faces of the diaphragm outer tubular fitting 24 and the tubular wall section 36 of the main rubber outer tubular fitting 22.

In this embodiment, by means of superimposing the first integrally vulcanization molded component 26 and the second integrally vulcanization molded component 30 on generally the same center axis, the pair of elastic support plates 66, 66 formed projecting from the inside peripheral face of the diaphragm 28 are each positioned to one side across the width of the sloped groove 44 formed in a circumferential section of the tapered outside peripheral face of the main rubber elastic body 16, and extend in the same direction as the sloped groove 44. In this embodiment in particular, the pair of elastic support plates 66, 66 are positioned with the projecting distal edges thereof each situated over the sloped groove 44 to either side edge of the sloped groove 44 across its width; and the projecting distal edge of each elastic support plate 66 is formed with a shape conforming to the floor of the sloped groove 44, with the projecting distal edge of the elastic support plate 66 situated spaced apart by a generally unchanging distance from the floor of the sloped groove 44. The projecting distal edge of the elastic support plate 66 enters partly into the sloped groove 44, with the elastic support plate 66 positioned stably over the sloped groove 44. The distance over which the elastic support plates 66 project out from the diaphragm 28 is sufficiently greater than the depth of the sloped groove 44, and in the event that the diaphragm 28 undergoes elastic deformation so as to approach the side wall face of the main rubber elastic body 16, the projecting distal edges of the elastic support plates 66 will come into contact with the floor of the sloped groove 44, thereby regulating the relative distance between the diaphragm 28 and the main rubber elastic body 16 in the areas where the sloped groove 44 and the elastic support plates 66 are formed, and preventing the diaphragm 28 from becoming stuck against the side wall face of the main rubber elastic body 16.

A partition plate fitting 76 and a cover member 78 are attached to the lower opening of the main rubber outer tubular fitting 22. The cover member 78 has an excitation plate 82 constituting an excitation member in the center portion thereof vulcanization bonded to a support rubber elastic member 80 of generally annular plate shape, as well as an annular retaining fitting 84 vulcanization bonded to the outside peripheral portion thereof, the excitation plate 82 and the annular retaining fitting 84 being elastically coupled by the support rubber elastic member 80.

The excitation plate 82 is of disk shape having integrally formed at its outside peripheral edge an upwardly projecting annular linking portion 86. In the center portion of the excitation plate 82 there is integrally formed a downwardly extending actuating shaft 88, with a male thread being formed on the distal end of this actuating shaft 88. The excitation plate 82, including the annular linking portion 86 and the actuating shaft 88, is integrally formed of rigid material such as metal or synthetic resin.

The annular retaining fitting 84, on the other hand, has a flange shaped mounting plate 92 and a positioning projection 94 integrally formed on the upper and lower openings of a tubular portion 90 of round tubular shape. An annular press-fitting portion 96 that projects further downward is integrally formed at the outside peripheral edge of the mounting plate 92.

The excitation plate 82 is disposed spaced diametrically inward from the annular retaining fitting 84 and positioned generally on the same center axis therewith, with the support rubber elastic member 80 disposed so as to expand between the diametrically opposing faces of the annular retaining fitting 84 and the excitation plate 82. The support rubber elastic member 80 is vulcanization bonded at the inside and outside peripheral edges thereof respectively to the annular linking portion 86 of the excitation plate 82 and the tubular portion 90 of the annular retaining fitting 84. Accordingly, the area between the excitation plate 82 and the annular retaining fitting 84 is closed off fluid tightly by the support rubber elastic member 80. In proximity to the annular linking portion 86 of the excitation plate 82, there is formed a stopper rubber 98 of a shape that covers the annular linking portion 86. This provides cushion-wise limitation of the extent of movement of the excitation plate 82 in the direction approaching the partition plate fitting 76, as well as reducing shock and striking noise during contact. In this embodiment, the height of the stopper rubber 98 varies in the circumferential direction of the annular linking portion 86, ensuring an appropriate gap from the partition plate fitting 76 even when the stopper rubber 98 is in abutment with the partition plate fitting 76, thus avoiding blocking off of the excitation chamber 108, described later. By means of this design, it is possible to reduce the extent to which the excitation plate 82 is subjected to suction force towards the partition plate fitting 76 due to the pressure of the non-compressible fluid.

The partition plate fitting 76 has a thin disk shape, the outside diameter dimension of which is of a size extending as far as the diametrical medial portion of the mounting plate 92 in the annular retaining fitting 84. The center portion of the partition plate fitting 76 projects upward with a generally trapezoid shape and is perforated by a number of orifice holes 100. Along the circumference situated in proximity to the outside peripheral edge of the partition plate fitting 76, a number of fastening pieces 102 project upward.

The partition plate fitting 76, positioned in the axis-perpendicular direction by means of the fastening pieces 102, is attached over the lower opening of the diaphragm outer tubular fitting 24, with its outside peripheral edge superimposed against the flange shaped portion 38 of the main rubber outer tubular fitting 22. Additionally, the cover member 78 is attached to the lower opening of the diaphragm outer tubular fitting 24 from below partition plate fitting 76, and the mounting plate 92 of the annular retaining fitting 84 in the cover member 78 is superimposed against the main rubber outer tubular fitting 22 and the partition plate fitting 76, with their outside edges fastened through caulking by means of the caulking piece 58 of the diaphragm outer tubular fitting 24.

By means of this arrangement, the lower opening of the diaphragm outer tubular fitting 24 is covered fluid tightly by the cover member 78, thereby forming between the opposing faces of the main rubber elastic body 16 and the cover member 78 a pressure-receiving chamber 104 having a non-compressible fluid sealed therein. A portion of the wall of this pressure-receiving chamber 104 is constituted by the main rubber elastic body 16, whereby when vibration in input across the first mounting member 12 and the second mounting member 14, vibration is input and pressure fluctuations are produced on the basis of elastic deformation of the main rubber elastic body 16.

The partition plate fitting 76 is disposed in the pressure-receiving chamber 104, dividing the pressure-receiving chamber 104 in two to form on either side of the partition plate fitting 76 a vibration input chamber 106 located on the main rubber elastic body 16 side and an excitation chamber 108 located on the cover member 78 side. The vibration input chamber 106 and the excitation chamber 108 communicate with each other via an orifice holes 100.

The main rubber elastic body 16 and the diaphragm 28 are affixed at their inside peripheral edge and outside peripheral edge respectively to the first mounting member 12 and the second mounting member 14, thereby forming between the opposing faces of the main rubber elastic body 16 and the diaphragm 28 an equilibrium chamber 110 having a non-compressible fluid sealed therein. Specifically, a portion of the wall of the equilibrium chamber 110 is constituted by the readily deformable diaphragm 28, thereby readily permitting change in volume based on elastic deformation of the diaphragm 28. As the non-compressible fluid sealed within the pressure-receiving chamber 104 and the equilibrium chamber 110, it is preferable to use a low-viscosity fluid having viscosity of 0.1 Pa·s or lower, in order to efficiently obtain vibration damping effect based on resonance of fluid flowing through an orifice passage 116 (described later), within the vibration frequency range required of the automotive engine mount 10.

The pressure-receiving chamber 104 and the equilibrium chamber 110 formed thereabove connect with one another by means of the annular passage 74 formed within the second mounting member 14, which passage connects at a first circumferential end thereof to the pressure-receiving chamber 104 via a through-hole (not shown) and connects at the other circumferential end thereof to the equilibrium chamber 110 through a communication window 114 constituted as an opening formed in a circumferential portion of the tapered tube portion 40 of the diaphragm outer tubular fitting 24. With this arrangement, there is formed the orifice passage 116 of prescribed length connecting the pressure-receiving chamber 104 and the equilibrium chamber 110 with one another so as to permit the flow of fluid between the chambers 104, 110. The orifice passage 116 is tuned by means of appropriately establishing its passage cross sectional area and passage length, so that vibration damping action based of resonance of fluid induced to the flow within it on the basis of a pressure differential between the pressure-receiving chamber 104 and the equilibrium chamber 110 created during input of vibration is effectively attained in the frequency range of engine shake and other low-frequency, large-amplitude vibration.

Here, the sloped groove 44 is formed on the outside peripheral face of the main rubber elastic body 16, upward in the axial direction from the communication window 114 which is the opening of the orifice passage 116 on the equilibrium chamber 110 side. Specifically, the orifice passage 116 is connected via the communication window 114 to one end of the sloped groove 44. The opening of the orifice passage 116 on the equilibrium chamber 110 side need not necessarily connect to one end of the sloped groove 44; it is sufficient for the sloped groove 44 to be formed towards the small-diameter end (axial upper end) of the main rubber elastic body 16 in proximity to the opening of the orifice passage 116 on the equilibrium chamber 110 side. That is, it is acceptable, for example, for the opening of the orifice passage 116 on the equilibrium chamber 110 side to connect to a medial portion of the sloped groove 44; in this case, the sloped groove 44 may be formed to both sides in the axial direction, to either side of the orifice passage 116 on the equilibrium chamber 110 side.

On the opposite side of the cover member 78 from the pressure-receiving chamber 104, there is disposed an electromagnetic exciter 118 as an actuator. This electromagnetic exciter 118 has a stationarily attached coil 122 housed within a housing 120 of generally cup form, and around the coil 122, stationarily attached upper and lower yokes 124, 126 each composed of an annular ferromagnetic body and forming a magnetic path. To describe in greater detail, the upper yoke 124 and the lower yoke 126 are formed from ferromagnetic bodies that are connected magnetically via the housing 120 and that cooperate to form a magnetic path extending so as to surround the coil 122 in longitudinal cross section. On this magnetic path, a magnetic gap is formed between the upper yoke 124 and the lower yoke 126 in the inside circumferential portion of the coil 122, and a sliding element 128 serving as the output member is disposed at a location corresponding to this gap. By passing current through the coil 122, there are generated magnetic poles that face each other on the opposing faces of the upper and lower yokes 124, 126, so that the sliding element 128 is subjected to actuating force in the axial direction towards the lower yoke 126.

A tubular inside peripheral face 130 is formed as a guide hole passing through the center of the upper yoke 124 which forms the magnetic path, and tubular inside peripheral face 130 is installed an elastically positioned guide sleeve 132. The sliding element 128 is slidably installed within the guide sleeve 132, so as to be actuated in the axial direction while guided by the guide sleeve 132.

The sliding element 128 has a generally round tubular shape overall, and at its outside peripheral face is slidable against the guide sleeve 132, while on its inside peripheral face there is formed an inwardly projecting annular mating projection 134.

The electromagnetic exciter 118, disposed with a flange portion 136 formed on the peripheral edge of the opening of the housing 120 superimposed against the mounting plate 92 of the annular retaining fitting 84 in the cover member 78, is affixed, together with the annular retaining fitting 84 etc., through caulking to the second mounting member 14 by means of the caulking piece 58. The electromagnetic exciter 118 is thereby attached on the same center axis, so that the center axis of sliding of the sliding element 128 is generally aligned with the center axes of the first and second mounting members 12, 14.

The actuating shaft 88 of the excitation plate 82 is inserted from above along the center axis into electromagnetic exciter 118 attached in this way, with the actuating shaft 88 being passed through the mating projection 134 of the sliding element 28. A coil spring 138 is externally fitted onto the actuating shaft 88 so as to be disposed spanning between the opposing faces of the excitation plate 82 and the mating projection 134 of the sliding element 128. A positioning nut 140 is threaded onto the distal end of the actuating shaft 88 which has been passed through the mating projection 134. The positioning nut 140 is screwed onto the actuating shaft 88, compressing the coil spring 138 against the excitation plate 82 via the mating projection 134 of the sliding element 128, thereby fixedly positioning the sliding element 128 with respect to the actuating shaft 88. In this embodiment, the two ends of the coil spring 138 are crowned by a collar member 142, to reduce wear caused by the coil spring 138 rubbing against other components. The actuating shaft 88 and the sliding element 128 are coupled in a substantially fixed state in the axial direction under the urging force of the coil spring 138, whereby actuating force acting on the sliding element 128 when current flows to the coil 122 is exerted on the actuating shaft 88.

In short, the axial direction mounting location of the sliding element 128 with respect to the excitation plate 82 supported elastically positioned on the second mounting member 14 by means of the support rubber elastic member 80 can be modified by adjusting the extent to which the positioning nut 140 is screwed onto the actuating shaft 88, and it is thereby possible to make fine adjustments to the distance between the faces on which magnetic force acts, namely, the opposing faces of the sliding element 128 and the lower yoke 126. In this embodiment, a lock bolt 144 is fastened to the positioning nut 140 from the axial lower end, and the lock bolt 144 within the screw hole of the positioning nut 140 contacts the distal end of the actuating shaft 88, thereby locking the fastening position of the positioning nut 140 on the actuating shaft 88.

A slight gap is formed between the opposing faces of the sliding element 128 and the outside peripheral edge of the positioning nut 140, and the sliding element 128 is superimposed against and held abutting the positioning nut 140 in a state allowing it to undergo sliding displacement in the axis-perpendicular direction with respect to the actuating shaft 88. By means of this arrangement, it is possible to absorb relative positional deviation of the actuating shaft 88 and the sliding element 128 caused by dimensional error during production of parts or by positioning error during assembly, so that the sliding element 128 can be positioned stably in the axis-perpendicular direction with respect to the coil 122. Additionally, transitory axial deviation (relative displacement in the axis-perpendicular direction) occurring during actuator operation can be advantageously absorbed as well, so that consistent operating characteristics can be attained. The level of permissible relative displacement in the axis-perpendicular direction is favorably within the range of 0.2 mm-3 mm.

The center of the lower wall of the housing 120 of the electromagnetic exciter 118 is perforated by a through-hole 146, so that the lower yoke 126 positioned in opposition of the sliding element 128 and exerting magnetic force thereon is exposed to the outside, and the internal space of the electromagnetic exciter 118 in which the sliding element 128 is disposed opens directly to the outside through a center hole 148 in the lower yoke 126. A hex wrench or similar tool can be inserted into the opening of the center hole 148 of the lower yoke 126 through this opening, and the aforementioned lock bolt 144 and positioning nut 140 manipulated in order to adjust the position of the sliding element 128 from the outside.

The center hole 148 of the lower yoke 126 expands in diameter in proximity to the lower opening thereof to form a large-diameter section 150, and a cover plate fitting 154 having a rubber layer 152 vulcanization bonded over substantially one entire face thereof is attached to the large-diameter section 150. By means of this design, the center hole 148 formed in the lower yoke 126 of the electromagnetic exciter 118 is covered fluid tightly in the large-diameter section 150 at its lower opening.

With the cover plate fitting 154 attached in this way, the center portion of the cover plate fitting 154 is positioned in opposition to and spaced apart a prescribed distance axially below the distal end face of the actuating shaft 88 of the excitation plate 82, whereby in the event that a large vibration load is input across the first mounting member 12 and the second mounting member 14 and gives rise to excessive pressure in the pressure-receiving chamber 104, the distal end of the actuating shaft 88 will come into abutment with the cover plate fitting 154 via the rubber layer 152, thus limiting in a cushion-wise manner the extent of displacement of the excitation plate 82.

In the engine mount 10 having the construction described above, a tubular bracket 156 is additionally fitted externally onto the electromagnetic exciter 118. The tubular bracket 156 has a flange shaped portion 158 at its upper opening. This flange shaped portion 158, together with the flange shaped portion 38 of the main rubber outer tubular fitting 22, the flange shaped mounting plate 92 of the annular retaining fitting 84, and the flange portion 136 of the housing 120, are affixed by caulking to the diaphragm outer tubular fitting 24 by means of the caulking piece 58. The section below the approximately axial center section is constituted as an inverted taper section 160 of skirt shape expanding in diameter axially downward. A mounting portion 162 that spreads diametrically outward is integrally formed at the rim of the opening of the inverted taper section 160. Several mounting holes (not shown) are formed in the mounting portion 162, enabling it to be mounted as a vibration damping member (likewise not shown) on the chassis (body) of an automobile.

While not depicted in the drawings, the engine mount 10 is installed between the power unit and the body by means of attaching the first mounting member 12 to a member on the power unit side (not shown) by means of a fastening bolt passed through the bolt hole 52, while attaching the second mounting member 14 to a member on the vehicle body side with a fastening bolt (not shown) via the tubular bracket 156. In the installed state, when vibration is input across the first mounting member 12 and the second mounting member 14, flow of fluid through the orifice passage 116 is generated on the basis of the pressure differential between the pressure-receiving chamber 104 and the equilibrium chamber 110 produced in association with elastic deformation of the main rubber elastic body 16. On the basis of resonance and other flow action of the fluid, passive vibration damping action is attained. Additionally, by means of exciting actuation of the excitation plate 82 with the electromagnetic exciter 118 by controlling the flow of current to the coil 122 at frequency and phase depending on the vibration to be damped, pressure fluctuations are exerted from the excitation chamber 108 to the vibration input chamber 106 through the orifice holes 100, whereby dynamic vibration damping of input vibration can be attained through dynamic control of pressure fluctuations in the vibration input chamber 106.

In the automotive engine mount 10 constructed according to this embodiment, the diaphragm 28 is caused to undergo sagging deformation in convex form by means of the effect of gravity on the diaphragm 28, so that even where the diaphragm 28 and the main rubber elastic body 16 are in proximity to one another, it is possible to avoid a situation where the diaphragm 28 undergoes excessive elastic deformation in proximity to the opening of the orifice passage 116 on the equilibrium chamber 110 side, becoming stuck against the main rubber elastic body 16, whereby consistent vibration damping action by the orifice passage 116 can be attained.

Since the pair of elastic support plates 66, 66 with projecting height greater than the depth dimension of the sloped groove 44 are formed on the outside peripheral face of the main rubber elastic body 16, when the diaphragm 28 and the main rubber elastic body 16 are urged into proximity with one another, the projecting distal ends of the elastic support plates 66 will come into contact with the floor of the sloped groove 44 before the diaphragm 28 comes into contact with the outside peripheral face of the main rubber elastic body 16. By means of this design, the distance separating the diaphragm 28 and the main rubber elastic body 16 is regulated by the projecting height of the elastic support plates 66 and the depth of the sloped groove 44, thereby preventing the diaphragm 28 from becoming stuck against the main rubber elastic body 16 in proximity to the equilibrium chamber 110 side opening of the orifice passage 116 formed by the elastic support plates 66 and the sloped groove 44.

With this arrangement, excessive contractile elastic deformation of the diaphragm 28 in proximity to the openings of the orifice passage 116 into the two chambers 104, 110 (where particularly large pressure fluctuations tend to be produced by fluid induced to flow through the orifice passage 116 between the two chambers 104, 110 during vibration input), the opening of the orifice passage 116 on the equilibrium chamber 110 side is consistently be maintained in an unobstructed state without becoming blocked off due to elastic deformation of the diaphragm 28, making it possible to effectively achieve vibration damping action based on resonance of fluid induced to flow through the orifice passage 116.

Additionally, since the pair of elastic support plates 66, 66 are formed extending in the direction of the groove and spaced apart from one another across the width of the sloped groove 44, a passage-like zone a portion of whose wall is constituted by the elastic support plates 66, 66 and the sloped groove 44 is maintained constantly in a unobstructed state. Further, since the sloped groove 44 connects to the orifice passage 116, the opening of the orifice passage 116 on the equilibrium chamber 110 side is always maintained in a stable unobstructed state by means of the passage-like zone in the constant unobstructed state. Consequently, consistent flow of fluid caused to flow through the orifice passage 116 can be attained, and more consistent vibration damping performance can be achieved.

Additionally, a generally flat floor is given to the sloped groove 44 which connects to the opening of the orifice passage 116 on the equilibrium chamber 110 side, and the sloped groove 44 is made gradually shallower towards the first mounting member 12 from the equilibrium chamber 110 side of the orifice passage 116. This arrangement makes it possible to produce smooth flow of the fluid induced to flow through the sloped groove 44, so that the level of fluid flow through the orifice passage 116 can be advantageously assured. In this embodiment in particular, by disposing the pair of elastic support plates 66, 66 to either side of the sloped groove 44 across its width, the flow regulating action of the sloped groove 44 is more effectively attained. Particularly in this embodiment, by forming the elastic support plates 66, 66 continuously in the direction of formation of the sloped groove 44, flow regulating action of the flowing fluid can be more advantageously attained.

By forming the elastic support plates 66 so as to become gradually thinner towards the projecting distal end, the impact force produce just after the elastic support plates 66 contact the sloped groove 44 can be effectively absorbed. Thus, striking noise and vibration can be reduced or eliminated. In the event that the striking force is strong, excessive deformation of the diaphragm 28 is consistently restricted by basal portion, which is thicker compared to the projecting distal end.

Since the elastic support plate 66 is formed so as to straddle the medial bowed portion 62 of the diaphragm 28, bending of the elastic support plate 66 from its basal portion so that it collapses is effectively prevented. Accordingly, regulation of elastic-deformation of the diaphragm 28 by the elastic support plates 66 can be effectively attained.

While the present invention has been described in detail in its presently preferred embodiment, for illustrative purpose only, it is to be understood that the invention is by no means limited to the details of the illustrated embodiment.

Figure 3:
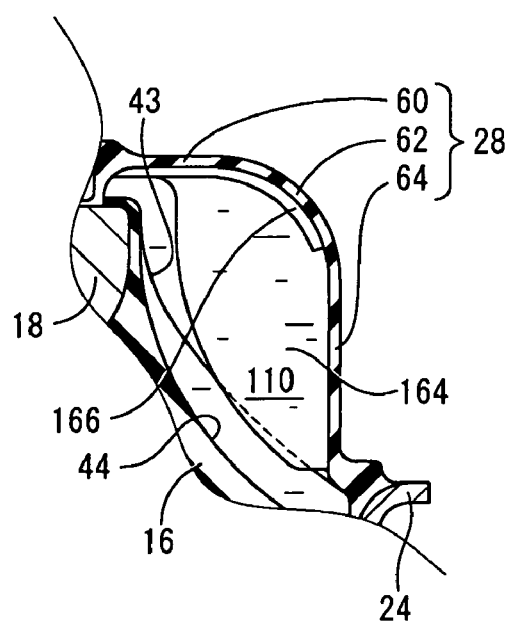
FIG. 3 is a cross sectional view showing a principle part of an engine mount of construction according to another embodiment of the invention.

For example, the shape of the elastic support plates 66 is not limited to the specific disclosure in the preceding embodiment, and may be modified appropriately depending on the required characteristics. As a specific example, as depicted in FIG. 3, an elastic support plate 164 may be formed with generally unchanging thickness dimension, but provided over a portion of the basal end side thereof with a reinforcing rib 166 that is thicker than the elastic support plate 164 and that projects out from the diaphragm 28 with a projection dimension smaller than the projection dimension of the elastic support plate 164. By means of this construction, in addition to the effect of restricting elastic deformation of the diaphragm 28 by means of the elastic support plate 164, it is also possible by means of a reinforcing rib 166 to impart a certain amount of rigidity to the diaphragm 28 so that excessive deformation of the diaphragm 28 can be prevented effectively. The reinforcing rib 166 depicted in FIG. 3 can be formed so as to extend from the inside peripheral edge of the inside tabular portion 60 to a medial portion of the medial bowed portion 62 making up the diaphragm 28.

Further, it is not necessary to form a pair of elastic support plates 66 spaced apart from one another across the groove width. Specifically, it would be acceptable, for example, to form a single elastic support plate 66 extending in the lengthwise direction of the sloped groove 44, or to form a pair of elastic support plates 66, 66 described in the preceding embodiment as well as an elastic support plate 66 spaced apart from both across the groove width, to form three elastic support plates 66, 66, 66 extending parallel to one another in the lengthwise direction of the sloped groove 44. Also, in the preceding embodiment, the elastic support plates 66 are formed so as to extend continuously across the inside tabular portion 60 and the medial bowed portion 62 on the inside face of the diaphragm 28. However, the elastic support plates need not be formed continuously as in the preceding embodiment, it being acceptable for a single elastic support plate 66 to be divided into multiple sections in its lengthwise direction. In the preceding embodiment, the extension direction in which the elastic support plate 66 extends continuously is the lengthwise direction of the elastic support plate 66.

Additionally, whereas in the preceding embodiment the elastic support plate 66 projects in a generally orthogonal direction with respect to the diaphragm 28, by arranging the elastic support plate 66 so as to project in a direction inclined by a prescribed angle with respect to the diaphragm 28, it is possible to design the elastic support plate 66 to collapse towards a specific direction when the elastic support plate 66 comes into contact with the sloped groove 44 floor.

While the sloped groove 44 is preferably formed with a gradually shallower depth moving away from the opening of the orifice passage 116 as taught in the preceding embodiment, so as to attain effective flow regulating effect, it is not necessary for it to take the particular shape taught in the embodiment. Also, whereas in the preceding embodiment the sloped groove 44 has a floor which is a generally flat surface, it is not necessary for it to be a flat surface, it being possible instead to improve flow regulating effect by furnishing the sloped floor surface with a plurality of convex ridges extending in the sloped groove 44 formation direction.

Additionally, in the preceding embodiment, an electromagnetic exciter 118 was employed as the actuator. However, the actuator is in no wise limited to the specific disclosure in the embodiment. It would be possible instead to employ another known art actuator, such as a pneumatic actuator of the kind disclosed in JP-A-2000-346121 and U.S. Pat. No. 6,679,486. Further, this kind of actuator is not always necessary.

It is also to be understood that the present invention may be embodied with various other changes, modifications and improvements, which may occur to those skilled in the art, without departing from the spirit and scope of the invention defined in the following claims.

What is claimed is:

1. A fluid-filled type vibration-damping device comprising:
   a main rubber elastic body of generally frustoconical shape;
   a first mounting member affixed to an axial upper end of the main rubber elastic body;
   a second mounting member affixed to an axial lower end of the main rubber elastic body;
   a pressure-receiving chamber formed axially below the main rubber elastic body, being partially defined by the main rubber elastic body and having a non-compressible fluid sealed therein;
   an equilibrium chamber having a non-compressible fluid sealed therein and formed between the main rubber elastic body and a flexible film by disposing the flexible film so as to cover an outside face of the main rubber elastic body; and
   an orifice passage through which the pressure-receiving chamber and the equilibrium chamber communicate with each other;
   wherein an equilibrium-chamber-side opening of the orifice passage is situated in proximity to an axial lower end of the outside face of the main rubber elastic body;
   wherein a guide groove extending in a straight line axially upward is formed on the outside face of the main rubber elastic body in proximity to the equilibrium-chamber-side opening of the orifice passage; and
   wherein a projecting rib that projects from the flexible film towards the guide groove is formed extending along the guide groove, such that the projecting rib prevents the flexible film from directly contacting the guide groove.

2. A fluid-filled type vibration-damping device according to claim 1, wherein the guide groove is of sloped shape decreasing gradually in depth dimension as it goes away from the equilibrium-chamber-side opening of the orifice passage.

3. A fluid-filled type vibration-damping device according to claim 1, wherein the flexible film, at least in a region thereof covering an area where the guide groove is to be formed, includes: an outside vertical wall portion that projects so as to rise axially upward from an outside peripheral edge of the axial lower end of the main rubber elastic body; a bowing wall portion that extends bowing diametrically inward in arcuate shape from a projecting distal edge of the outside vertical wall portion; and an inside peripheral upper wall portion that expands diametrically inward in a generally flat shape from an inside peripheral edge of the bowing wall portion, and wherein the projecting rib projects from inside faces of the outside vertical wall portion, the bowing wall portion, and the inside peripheral upper wall portion of the flexible film, and is integrally formed over the outside vertical wall portion, bowing wall portion, and inside peripheral upper wall portion.

4. A fluid-filled type vibration-damping device according to claim 1, wherein the projecting rib is formed extending in the groove direction of the guide groove, with a cross section of smaller width dimension at a distal end side than at a basal end in a direction of projection.

5. A fluid-filled type vibration-damping device according to claim 1, wherein at a minimum with the device in an installed state being subjected to input of static support load, a projecting distal end portion of the projecting rib, over at least a lengthwise portion thereof, is positioned within the guide groove.

6. A fluid-filled type vibration-damping device according to claim 1, wherein the projecting rib comprises a pair of elastic support plates of thin fin shape, extending along the guide groove, and are formed such that first faces thereof situated in opposition to each other in a circumferential direction are generally parallel to each other, while other faces thereof gradually come closer to one another towards projecting distal edges thereof.

7. A fluid-filled type vibration-damping device according to claim 1, wherein the projecting rib comprises an elastic support plate of thin fin shape extending along the guide groove with a generally unchanging thickness dimension, and a reinforcing rib provided at a basal end side of the elastic support plate with a thickness dimension thicker than the elastic support plate, the reinforcing rib projecting out from the flexible film with a projection dimension smaller than that of the elastic support plate.

* * * * *